(12) United States Patent
Yang et al.

(10) Patent No.: US 11,980,807 B2
(45) Date of Patent: May 14, 2024

(54) ADAPTIVE RENDERING OF GAME TO CAPABILITIES OF DEVICE

(71) Applicant: Sony Interactive Entertainment Inc., Tokyo (JP)

(72) Inventors: Yiwei Yang, San Mateo, CA (US); Joshua Santangelo, San Mateo, CA (US); Jonathan Webb, San Mateo, CA (US); Benjamin Andrew Rottler, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 75 days.

(21) Appl. No.: 17/476,855

(22) Filed: Sep. 16, 2021

(65) Prior Publication Data
US 2023/0078189 A1    Mar. 16, 2023

(51) Int. Cl.
*A63F 13/211* (2014.01)
*A63F 13/213* (2014.01)
*A63F 13/655* (2014.01)
*A63F 13/92* (2014.01)

(52) U.S. Cl.
CPC .......... *A63F 13/211* (2014.09); *A63F 13/213* (2014.09); *A63F 13/655* (2014.09); *A63F 13/92* (2014.09); *A63F 2300/204* (2013.01)

(58) Field of Classification Search
None
See application file for complete search history.

(56) References Cited

U.S. PATENT DOCUMENTS

| | | | |
|---|---|---|---|
| 11,107,261 B2 * | 8/2021 | Scapel | G06V 40/166 |
| 11,504,630 B2 * | 11/2022 | Bress | A63F 13/87 |
| 2003/0152291 A1 | 8/2003 | Cheatle | |
| 2005/0143124 A1 | 6/2005 | Kennedy et al. | |
| 2006/0287083 A1 * | 12/2006 | Ofek | A63F 13/213 |
| | | | 463/37 |
| 2007/0230824 A1 | 10/2007 | Alvarez | |
| 2011/0227913 A1 * | 9/2011 | Hyndman | A63F 13/10 |
| | | | 345/419 |
| 2012/0133817 A1 | 5/2012 | Anderson | |
| 2014/0225930 A1 * | 8/2014 | Durmek | G09G 5/363 |
| | | | 345/659 |
| 2018/0352191 A1 * | 12/2018 | Eppolito | G09G 5/024 |

OTHER PUBLICATIONS

"International Search Report and Written Opinion", dated Jan. 24, 2023, from the counterpart PCT application.

* cited by examiner

*Primary Examiner* — Peter J Iannuzzi
(74) *Attorney, Agent, or Firm* — John L. Rogitz (57) ABSTRACT

An input device such as a cell phone or computer game controller being held in a portrait versus a landscape orientation is used to select different computer game modes, such as zooming, switching between first and third person perspectives, etc.

19 Claims, 4 Drawing Sheets

ADAPTIVE RENDERING OF GAME TO CAPABILITIES OF DEVICE

FIELD

The present application relates generally to the adaptive rendering of a computer simulation such as a computer game to the capabilities of the rendering device.

BACKGROUND

As understood herein, computer simulations such as computer games may be switched between various presentation modes, such as between first person (e.g., player) and third person (e.g., spectator) perspectives. As further understood herein, some people may prefer one mode over another, for instance if viewing a computer simulation from a particular perspective makes the person motion sick.

SUMMARY

Accordingly, a method includes identifying an orientation of a mobile telephone. The method also includes presenting a computer simulation on the mobile telephone and controlling execution of the computer simulation based at least in part on the orientation. In this way, adaptive rendering of a computer game to the capabilities of the mobile telephone is achieved. Execution of the computer simulation can also be based on a type of device of which the mobile telephone is. In some examples, the method may include transforming an image of a player of the computer simulation based at least in part on the orientation, with the image being from a camera on the mobile telephone.

In another aspect, a system includes at least one computer medium that is not a transitory signal and that in turn instructions executable by at least one processor to identify an orientation of an input device. The instructions are executable to, responsive to the orientation being landscape orientation, present on at least one display a computer simulation in a first mode. Also, the instructions are executable to, responsive to the orientation being portrait orientation, present on the at least one display the computer simulation in a second mode.

The input device may include, e.g., a wireless telephone or a computer simulation controller.

In some examples the first mode is first person mode, and the second mode is a third person mode. In other examples the first mode is a third person mode, and the second mode is a first-person mode. In still other examples at least one of the modes is a zoom mode and the other mode is not a zoom mode.

In another aspect, a method includes identifying an orientation of an input device, and responsive to identifying a first orientation of the input device, establishing a first presentation mode and/or first perspective mode of a computer simulation on a display. The method also includes responsive to identifying a second orientation of the input device, establishing a second presentation mode and/or second perspective mode of a computer simulation on the display.

In another aspect, an assembly includes at least one input device, at least one display for presenting a computer simulation associated with the input device, and at least one processor configured with instructions for identifying an orientation of the input device. The instructions are executable for, responsive to identifying a first orientation of the input device, establishing a first presentation mode and/or first perspective mode of a computer simulation on the display, and responsive to identifying a second orientation of the input device, establishing a second presentation mode and/or second perspective mode of a computer simulation on the display.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
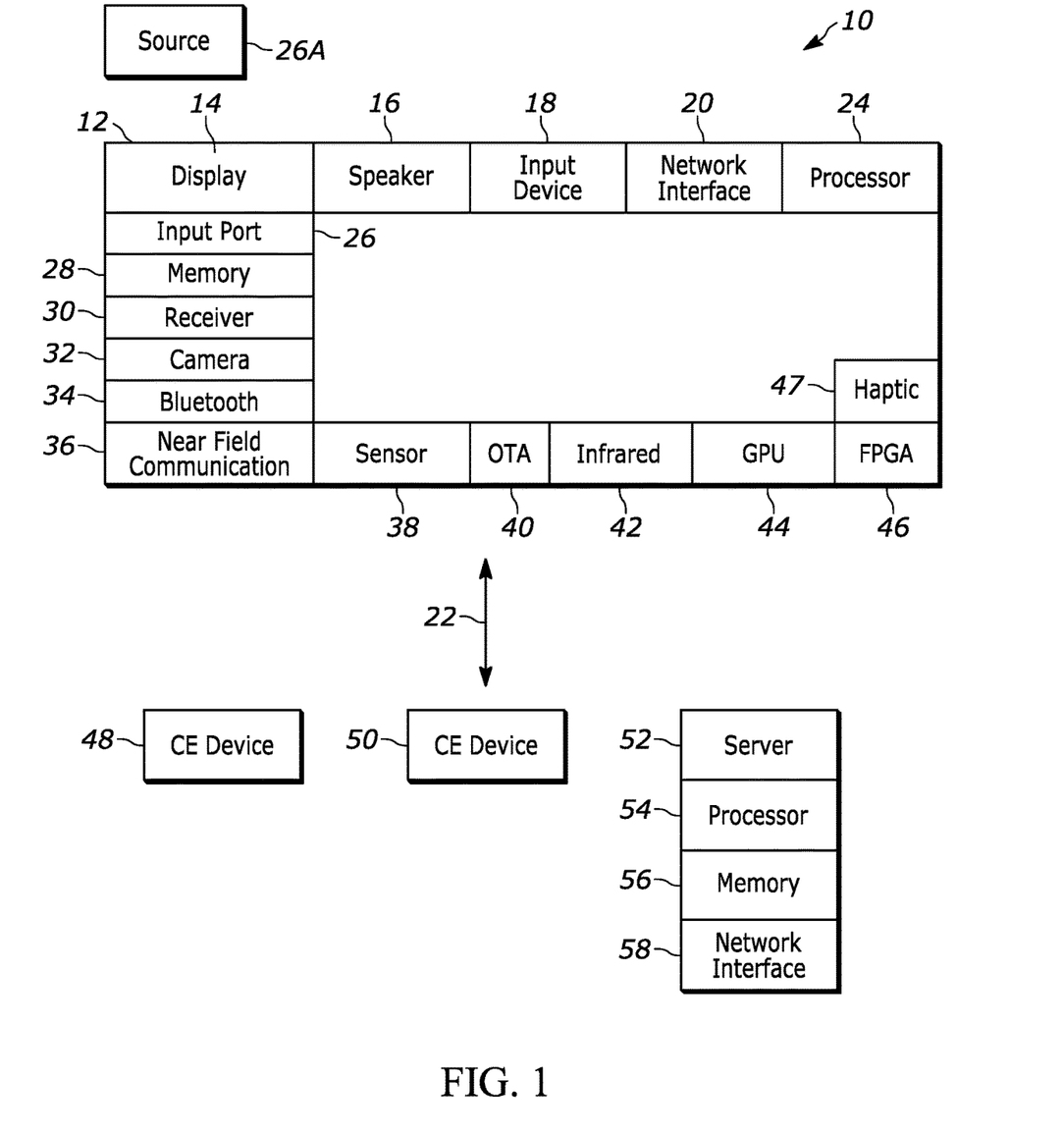
FIG. 1 is a block diagram of an example system including an example in accordance with present principles.

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
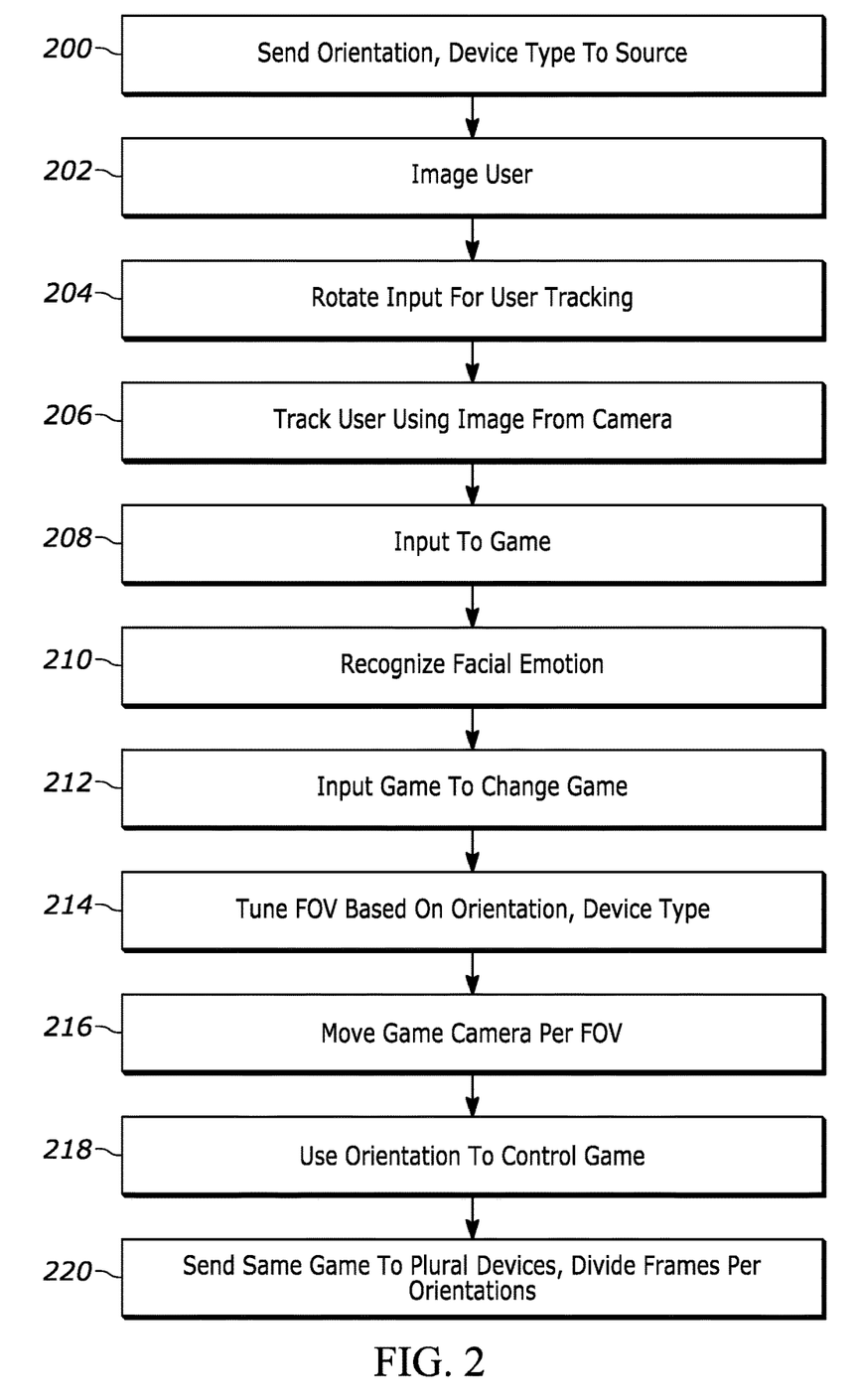
FIG. 2 illustrates example logic in example flow chart format.

FIG. 2 illustrates that game rendering may be adapted to the orientation of a device such as a mobile phone and if desired to the device type, both of which parameters may be sent, at block 200, to a source of computer games such as a server or console. Note that "source" may include a streaming network source and can encompass related entities such as a game engine that may be running on the device whose orientation and type are reported to the source. Thus, the logic of FIG. 2 may be executed at a server, a game console, a rendering device, or a game engine regardless of where the engine is being executed, or any combinations thereof.

The orientation of the device may be sensed by an inertial measurement unit (IMU) which can include some or all of the motion sensors described herein. The device type typically is known by the processor of the device. Thus, the game that may be presented on, e.g., the mobile phone itself can be controlled using the IMU of the phone as detailed further below.

Moving to block 202, a camera on the device such as any of the cameras described herein may image the face of the user of the device. Proceeding to block 204, the face detection input can be rotated as the device rotates for correct user tracking at block 206, such that the device always keeps gravity for purposes of body orientation rendering pointing down (toward the center of the Earth) no matter what the orientation of the device is. The user is tracked with the correctly (gravity down) image and provided to the game at block 208.

Thus, a camera on the device may image the user, which is transformed in an optimized way for the current device orientation and device type by a server, a game engine, or the device itself. This may be done using a machine learning (ML) model trained on a training set of orientation/device type pairs and ground truth image transformation information.

Further, at block 210 image recognition may be applied to the image of the user to recognize the user's facial expression (emotion), which at block 212 may be used to change the game, including changing the expression of an avatar associated with the user. Other non-limiting examples of changing the game based on emotion include: slowing down the game responsive to an emotion of "apprehensive"; speeding up the game responsive to an emotion of "pleased"; increasing the game level of difficulty responsive to an emotion of "bored"; decreasing a game level of difficulty responsive to an emotion of "frustrated"; and so on. Deriving emotion from face images may be executed using a machine learning (ML) model having a training set of facial images with tags representing ground truth emotions.

Moving to block 214, the field of view (FOV) of the rendered images may be tuned (i.e., changed or established) based on the orientation of the device and the device and the device type, which include pixel density and screen size. Then, at block 216 the game camera (perspective from which the game is presented) can be moved to match the FOV from block 214. The movement of the game camera may be implemented by a ML model trained on a training set of orientation/device type/FOV input tuples with ground truth optimum game camera placement.

Figure 3:
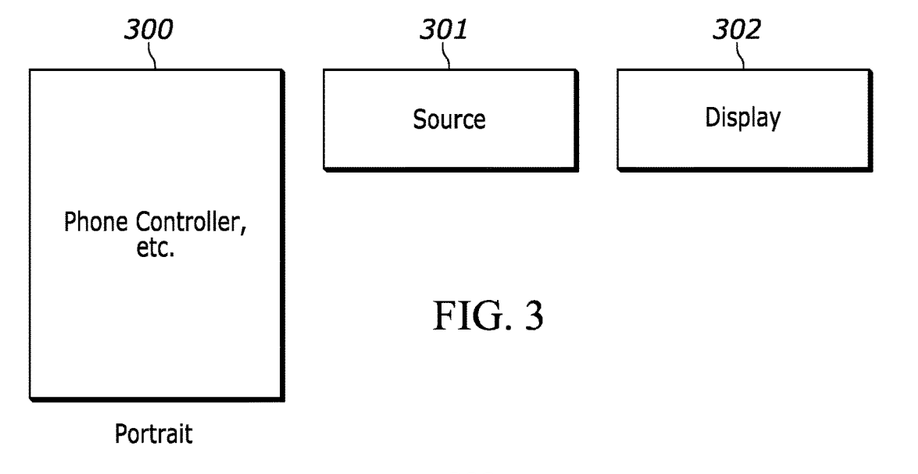
FIG. 3 schematically illustrates an input device in a portrait orientation.

Proceeding to block 218, the orientation and, if desired, device type may be used to control the game. FIG. 3 et seq. provide some specific examples. Note that sensors of the device including the camera also may be managed according to the device orientation and if desired capability by the game engine or the device or the server or console or a combination thereof.

Concluding with the description of FIG. 2, at block 220 the same game may be sent to plural devices, i.e., to the device of multiple players of the game and spectators of the game, with each frame being divided on each device into multiple windows according to the orientation of each particular device. Thus, one device may present the same frame as another device but with different divisions as between spectator view and player view(s) based on different orientations of the devices.

FIG. 3 illustrates an input device that may include some or all of the components described above. The input device 300 may be a mobile phone or a computer game controller to control a computer simulation such as a computer game from a source 301 of computer games, such as a computer game console or remote game streaming server, for presentation on a display 302, such as a TV or the display of the input device 300 itself. The devices 300, 301, 302 in FIG. 3 thus communicate with each other via wired and/or wireless paths, including local area network (LAN) network paths and/or wide area network (WAN) network paths. The source 301 and display 302 may also incorporate any appropriate components shown in FIG. 1.

Figure 4:
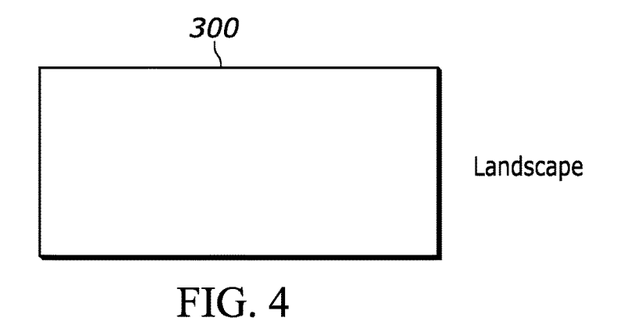
FIG. 4 schematically illustrates the input device in a landscape orientation.

In FIG. 3, the input device 300 is in a portrait orientation. Generally, a portrait orientation refers to a pose of the input device 300 relative to a user in which the long dimension of input device extends either vertically or slanted upwardly away from the user. FIG. 4 illustrates the input device 300 in a landscape orientation. Generally, a landscape orientation refers to a pose of the input device 300 relative to a user in which the long dimension of input device extends sideways relative to the user.

Figure 5:
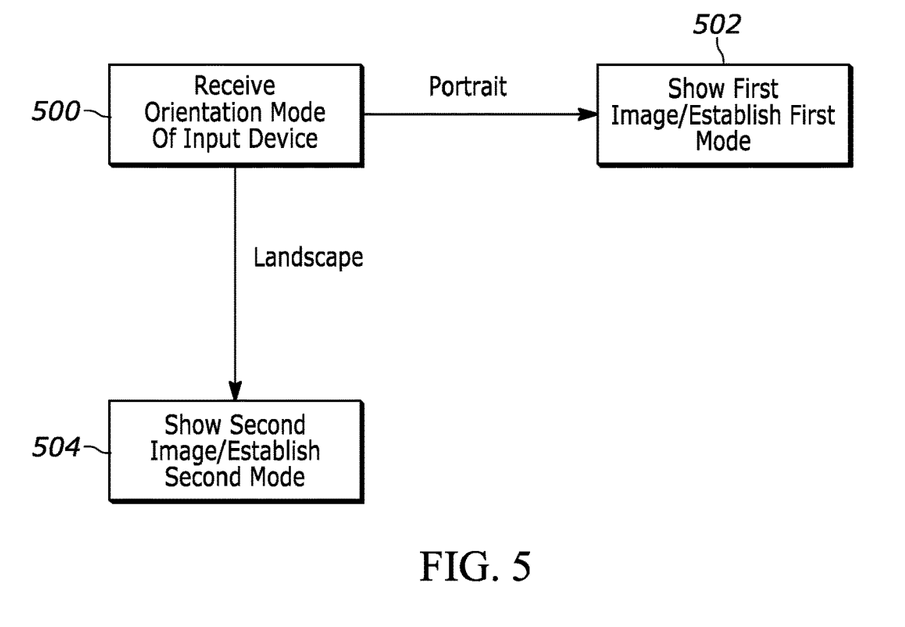
FIG. 5 illustrates example logic in example flow chart format.

FIG. 5 illustrates that at block 500, a processor such as any processor described herein including any one or more of the processors in the input device 300, source 301, and display 302 receives a signal from one or more motion and/or orientation sensors in the input device 300 indicating the orientation of the device, i.e., whether the device is in a landscape orientation or a portrait orientation. If in the portrait orientation, the logic moves to block 502 to present a first presentation mode and/or establish a first perspective mode of the computer game being presented on the display 302. On the other hand, if in the landscape orientation, the logic moves to block 502 to present a second presentation mode and/or establish a second perspective mode of the computer game being presented on the display 302.

Figure 6:
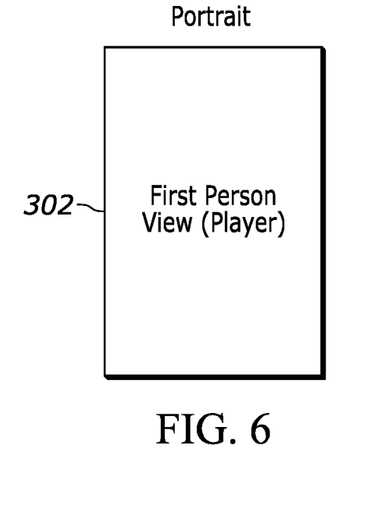
FIGS. 6 and 7 illustrate computer game perspective presentation modes for respective portrait and landscape orientations of the input device.
Figure 7:
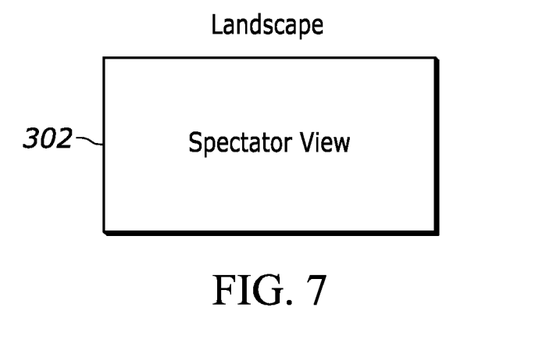

FIGS. 6 and 7 illustrate example first and second perspective modes of a computer simulation. In FIG. 6, the portrait orientation of the input device 300 has resulted in a first-person perspective view to be presented on the display 302, such as the perspective of the player of the game, whereas FIG. 7 indicates that the landscape orientation of the input device 300 has resulted in a third person perspective view to be presented on the display 302, such as the perspective of a spectator of the game. Or, the second mode may be a presentation of the game from the perspective of an opponent in the game. The modes may be switched, i.e., portrait orientation could establish third person perspective and landscape orientation could establish first person perspective.

Figure 8:
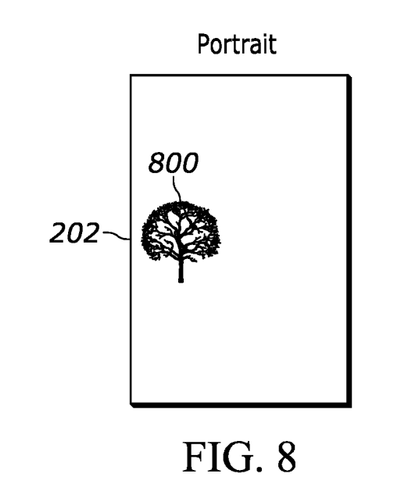
FIGS. 8 and 9 illustrate computer game zoom modes for respective portrait and landscape orientations of the input device.
Figure 9:
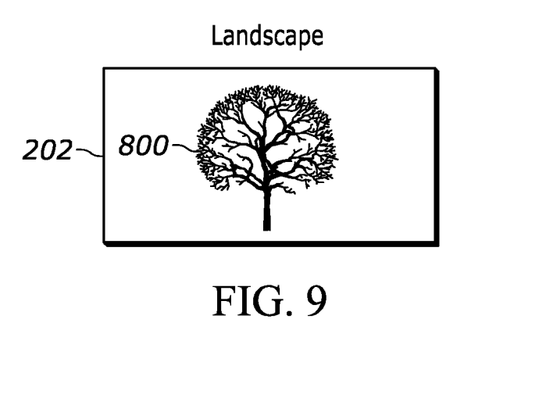

FIGS. 8 and 9 illustrate example first and second presentation modes of a computer simulation. In FIG. 8, the portrait orientation of the input device 300 has resulted in a normal size presentation mode in which an object 800 (such as a tree) is presented in accordance with a demanded size in the computer game, while in FIG. 9 the landscape orientation of the input device 300 has resulted in a zoomed size presentation mode in which the object 800 is presented in an enlarged or zoom size relative to the demanded size in the computer game. Thus, the orientation of the input device 300 may be used for dynamic scene scaling.

In addition to the above, orientation may be used to unlock the ability to see certain things only if device in certain orientation. If the user is getting close to the edge of game play in a particular orientation, a haptic warning may be implemented by the device.

Present principles contemplate additional techniques. Each of aspect ratio, resolution, pixel density, curvature, etc. and combinations thereof can be used to adapt the game in addition to or in lieu of orientation. The size, aspect ratio, and curvature of a display can be mapped to attributes of the camera used in a 3D game. For example, a curved display might map to a wider-angle lens. Adapting to different resolutions and pixel densities can cause a game to render different levels of detail or choose textures of different resolutions. It can also impact frame rate—if a lower-resolution display renders faster, the frame rate can increase.

Additionally, a game will look better if it's rendered at a resolution matching the display. A game rendered in the cloud at 1920×1080 but scaled up to fit a 1125×2436 phone display may show blurriness as a result of the scaling. Text and UI elements in particular will appear sharper if they're aligned to pixel boundaries. A wide-angle lens used on a curved display will look correct instead of appearing distorted.

A game can adapt to the input capabilities of the device. For example, virtual thumb-sticks on touchscreens are quite imprecise when it comes to aiming, and a game could make aiming easier in this case. A camera view could be controlled by an inertial measurement unit (IMU) if present. Character expressions of the user's face if a front-facing camera is present or an increased heart rate of the user can make a character in the game run faster. The weather and time of day in a game could match the weather and time of day of the user's location if available.

Still further, a client device can send the real time input, output, and environmental parameters to a server or set of servers in the cloud responsible for game simulation and scene rendering. The parameters can be mapped to various rendering pathways that define a template for how a base render should be manipulated to produce a suitable output for the client environment. This includes separating the render into multiple output framebuffers which are post processed and recomposited in a variety of ways before sending back to the client (or handled by the client(s)). For example, a user can connect with a tablet and a TV to the same session and the game renders the scene that will be applied to the TV as normal, but due to the presence of the tablet removes the heads-up display (HUD) portion of the render entirely. Because the HUD is removed, the game also enables selectable/interactable input in the part of the scene that would have been "under" the HUD. The server then takes a second pass to render the same geometry from a new top-down camera angle (overhead view) and merges this new framebuffer with another one into which it rendered the HUD, here scaled and with a layout appropriate to interaction on a tablet via touch. This task may be delegated to a separate server or set of servers in the cloud to run in parallel with the main render and may also pull additional data from the simulation such as player position and indicate it on this version of the scene that would not have been there in the main TV render.

Each render can then be sent to the relevant client device, and if a client device is removed or its status otherwise changes, the process is updated and transformed in real time to accommodate the change.

The presence of additional screens onto which a render could be split may be implemented in addition to things like ambient light brightness/hue, player distance/angle to screen, device motion, altitude/pressure, etc. as described above. The server(s) running the game can use ambient light data to change gamma, color temperature, or other factors to give the player a more color-correct experience to their eye based on the situation they are in. Player distance/angle to the screen can be used to influence the visibility or size of "distant objects" in the game world, awareness of enemies, rendering effects like parallax, or reactions by in-game characters to the player.

Device motion data can be obtained to create context—for example, many Android applications can ask the operating system for context such as running, walking, in a car, on a table, etc. and then manipulate the interface or functionality of the application. In this case, we might do the same but to influence an in-game experience as rendered by a cloud server or servers.

Altitude/pressure can be used for example to influence game world environment in response to the real-world environment of the player. This could happen in real time, for example, when the pressure drops there is a rainstorm in the game, or certain objects are only unlockable at/near sea level, or it could be asynchronously such as the player having recently ascended a hill/mountain and using that information to affect the abilities of the player from then on.

While the particular embodiments are herein shown and described in detail, it is to be understood that the subject matter which is encompassed by the present invention is limited only by the claims.

What is claimed is:

1. A method comprising:
   identifying an orientation of a mobile telephone;
   presenting a computer simulation on the mobile telephone;
   transforming an image of a player of the computer simulation based at least in part on the orientation, the image being from a camera on the mobile telephone, the transforming comprising, for purposes of body orientation rendering, keeping gravity pointing down (toward the center of the Earth) no matter what the orientation of the mobile telephone is such that the player is tracked with a gravity-correct image that is provided to the computer simulation; and
   controlling execution of the computer simulation based at least in part on the orientation.

2. The method of claim 1, comprising controlling execution of the computer simulation based at least in part on a type of device of which the mobile telephone is.

3. The method of claim 1, comprising presenting a first video frame representing a view of a player of the computer simulation responsive to the orientation being a first orientation and presenting the first video frame representing a view of a spectator of the computer simulation responsive to the orientation being a second orientation.

4. The method of claim 1, comprising presenting a first video object in a first size responsive to the orientation being a first orientation and presenting the first video object in a second size responsive to the orientation being a second orientation.

5. The method of claim 1, comprising presenting a first video object responsive to the orientation being a first orientation and not presenting the first video object responsive to the orientation being a second orientation.

6. An apparatus, comprising:
   at least one computer memory that is not a transitory signal and that comprises instructions executable by at least one processor to:
   identify an orientation of an input device;
   responsive to the orientation being stationary in landscape orientation, present on at least one display a computer simulation in a first mode;
   responsive to the orientation being stationary in portrait orientation, present on the at least one display the computer simulation in a second mode; and
   transform an image of a player of the computer simulation based at least in part on the orientation, the image being from a camera, the transform comprising, for purposes of body orientation rendering, keeping gravity pointing down no matter what the orientation of the input device is such that the player is tracked with a gravity-correct image that is provided to the computer simulation.

7. The apparatus of claim 6, wherein the input device comprises a wireless telephone.

8. The apparatus of claim 6, wherein the input device comprises a computer simulation controller.

9. The apparatus of claim 6, wherein the first mode comprises first person mode and the second mode comprises third person mode.

10. The apparatus of claim 6, wherein the first mode comprises third person mode and the second mode comprises first person mode.

11. The apparatus of claim 6, wherein at least one of the modes comprises a zoom mode and the other mode does not comprise a zoom mode.

12. The apparatus of claim 6, comprising:
    at least one input device;
    at least one display for presenting a computer simulation associated with the input device; and
    wherein instructions are executable for:
    responsive to identifying the landscape orientation, establishing a first perspective mode of a computer simulation on the display; and
    responsive to identifying the portrait orientation of the input device, establishing a second perspective mode of a computer simulation on the display.

13. A method, comprising:
    identifying an orientation of an input device;
    responsive to identifying the input device remaining in a first orientation of the input device, establishing a first presentation mode and/or first perspective mode of a computer simulation on a display;
    responsive to identifying the input device remaining in a second orientation of the input device, establishing a second presentation mode and/or second perspective mode of a computer simulation on the display; and
    transforming an image of a player at least in part on the orientation, the image being from a camera, the transforming comprising, for purposes of body orientation rendering, keeping gravity pointing down no matter what the orientation of the input device is such that the player is tracked with a gravity-correct image that is provided to the computer simulation.

14. The method of claim 13, comprising responsive to identifying the first orientation of the input device, establishing the first presentation mode, the first presentation mode comprising a zoom mode.

15. The method of claim 13, comprising responsive to identifying the first orientation of the input device, establishing the first perspective mode, the first perspective mode comprising a first-person perspective mode.

16. The method of claim 13, comprising responsive to identifying the second orientation of the input device, establishing the second presentation mode, the first presentation mode comprising a normal size no zoom mode.

17. The method of claim 13, comprising responsive to identifying the second orientation of the input device, establishing the second perspective mode, the second perspective mode comprising a perspective other than the first-person perspective.

18. The method of claim 13, wherein the first orientation comprises a landscape orientation.

19. The method of claim 13, wherein the second orientation comprises a portrait orientation.

* * * * *